J. W. CAMPBELL.
VARIABLE SPEED GEARING.
APPLICATION FILED MAR. 13, 1915.

1,182,751.   Patented May 9, 1916.

WITNESSES:
L. H. Schmidt
L. H. Stanley

INVENTOR
JAMES W. CAMPBELL
BY Munn & Co.
ATTORNEYS

UNITED STATES PATENT OFFICE.

JAMES W. CAMPBELL, OF RENO, NEVADA.

VARIABLE-SPEED GEARING.

1,182,751.
Specification of Letters Patent.
Patented May 9, 1916.

Application filed March 13, 1915. Serial No. 14,048.

*To all whom it may concern:*

Be it known that I, JAMES W. CAMPBELL, a citizen of the United States, and a resident of Reno, in the county of Washoe and State of Nevada, have invented a certain new and useful Improvement in Variable-Speed Gearing, of which the following is a specification.

My invention relates to improvements in variable speed gearing, and it consists in the combinations, constructions, and arrangements herein described and claimed.

An object of my invention is to provide a combination gearing by means of which various speeds may be imparted to the driven shaft, and in which the change from one speed to another is accomplished by means of clutch members, without the necessity of shifting gears out of or into mesh with certain other gears.

A further object of my invention is to provide a device of the type described in which the mechanism is shifted positively so as to give the desired speed and in which the device is locked after shifting so as to prevent another set of devices from in any way interfering with those in use.

A further object of my invention is to provide a device of the type described in which the drive shaft may be connected directly to the driven shaft without the use of friction clutches, and when so connected the other parts of the transmission mechanism are entirely free from the drive or driven shaft and hence are in a neutral and safe condition.

Other objects and advantages will appear in the following specification, and the novel features of the device will be particularly pointed out in the appended claims.

My invention is illustrated in the accompanying drawings, forming part of this application and in which—

Figure 1:
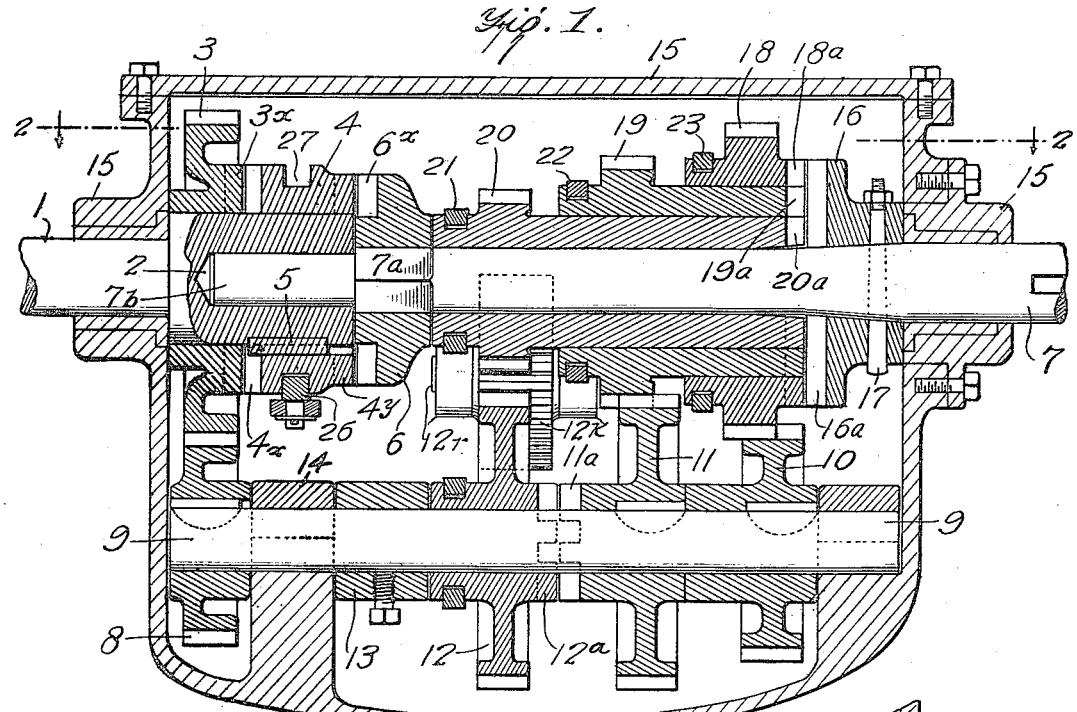
Figure 2:
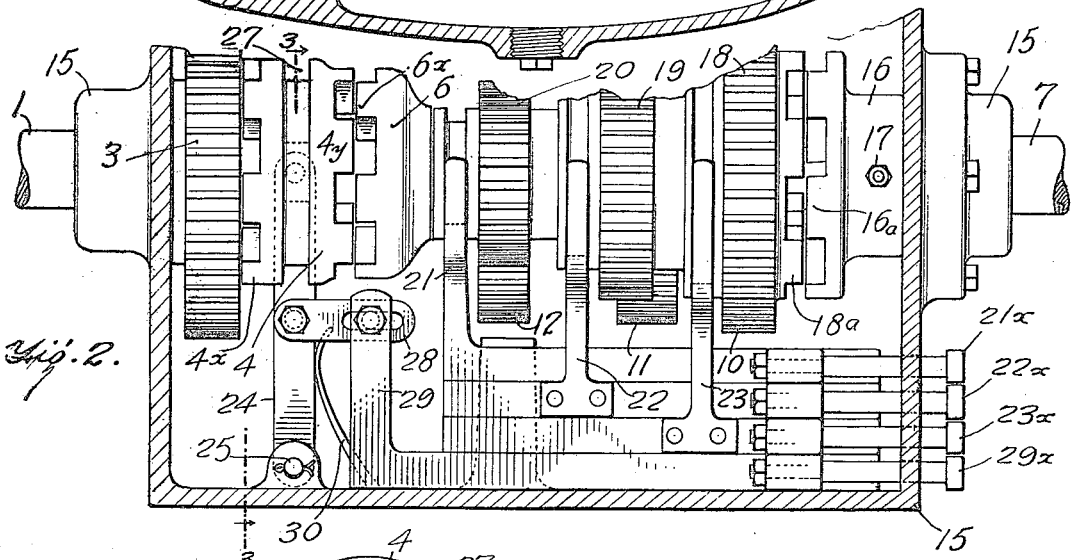
Figure 3:
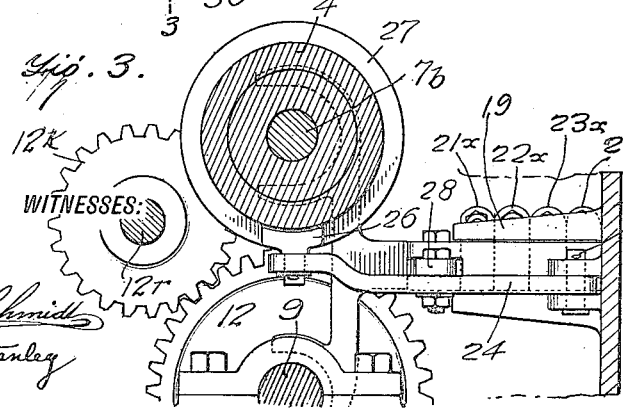

Figure 1 is a central section through the device; Fig. 2 is a section along the line 2—2 of Fig. 1; and Fig. 3 is a section along the line 3—3 of Fig. 2.

In carrying out my invention, I provide a driven shaft 1 having a central bore or recess 2 in its end, the latter being enlarged as shown in Fig. 1, and being provided with a loosely mounted gear 3 having clutch members $3^x$ arranged to engage similar clutch members $4^x$ of a sleeve 4 which is slidably mounted on the enlarged end of the shaft the key or feather 5 permitting a longitudinal movement of the clutch sleeve 4 with respect to the shaft while providing for the rotation of the clutch 4 with the shaft. On the opposite side of the clutch sleeve 4 from the clutch members $4^x$ are similar clutch members $4^y$ arranged to engage clutch members $6^x$ of a collar 6 which is disposed on the squared portion $7^a$ of the drive shaft 7, a reduced portion $7^b$ extending into the bore 2 as shown in Fig. 1. A gear 8 is keyed to a shaft 9 which is arranged parallel with the drive shaft 7. Two other gears are also keyed to this shaft 9. These gears are shown at 10 and 11 respectively. The gear 11 has clutch members $11^a$ arranged to engage clutch members $12^a$ carried by a gear 12. A collar 13 is secured to the shaft 9 between the bearing 14 and the gear 12. A shaft $12^r$ is provided upon which is mounted a gear $12^k$, this gear meshing with the gear 12 and with the gear 20 and forming part of the set of gears for the reverse movement of the driven shaft.

The drive shaft 7 is supported at one end by a portion of the casing 15. It is in direct alinement with the driven shaft 1 which passes through the opposite portion of the casing 15, the extended portion $7^b$ of the shaft 7 which enters the bore in the shaft 1, keeping these two shafts in alinement. On the inside of the casing 15 is a clutch member 16 which is secured to the drive shaft 7 by means of a pin 17. This clutch member 16 is arranged to be engaged by the clutch members $18^a$, $19^a$, or $20^a$ associated with the gears 18, 19, and 20 respectively. It will be observed that the gear 20 is on a long hub or sleeve which is loosely carried by the shaft 7, that the gear 19 is on a hub which is loosely carried by the hub of the gear 20, and that the gear 18 is loosely mounted on the hub of the gear 19. The hub of the gear 20 is provided with a yoke 21 which is connected with a plunger $21^x$ extending through the casing 15. The gear 19 is provided with a yoke 22 which is associated with the plunger $22^x$. The gear 18 has a yoke 23 which is connected with the plunger $23^x$.

An arm 24 is pivotally mounted at 25 (see Fig. 2) and bears at its end a shoe 26 which rides in the groove 27 in the clutch sleeve 4. The arm 24 is connected by means of a slotted link 28 with an arm 29 connected with the plunger 29ˣ. A spring 30 bears on the arm 24. The purpose of the arrangement just described is to permit the plunger 29ˣ to have a uniform throw or movement with the other similar plungers, 21ˣ, 22ˣ, and 23ˣ. The arm 24 is twice as long as the arm 29 so as to multiply the throw of the clutch sleeve 4, thereby providing a positive engagement of the clutch members on either side thereof.

From the foregoing description of the various parts of the device, the operation thereof may be readily understood.

In the drawings, the parts are shown in their neutral position. Let us assume that a low speed is desired. The plunger 29ˣ is first pushed in thereby bringing the clutch members 3ˣ and 4ˣ into engagement so as to connect the gear 3 with the driven shaft 1. The plunger 22ˣ is now moved outwardly in the direction indicated by the arrow in Fig. 2 and through the medium of the yoke 22 moves the gear 19 and its hub which contains the clutch member 19ᵃ toward the clutch member 16, the clutch member 19ᵃ engaging with the clutch member 16ᵃ. The movement of the drive shaft 7 is communicated to the driven shaft 1 through the inner connection of the following parts: 16, 16ᵃ, 19ᵃ, 19, gear 11, shaft 9, gear 8, gear 3, clutch members 3ˣ and 4ˣ, clutch sleeve 4, and shaft 1. It will be observed that the gears 19 and 8 are both smaller than their engaging gears 11 and 3 and hence the motion transmitted to the shaft 1 will be relatively slow.

In case direct movement of the shaft 7 is desired to be transmitted to the shaft 1, the parts being in neutral position, the plunger 29ˣ is drawn outwardly thus causing the engagement of clutch members 4ʸ and 6ˣ. The clutch collar 6 which bears the teeth 6ˣ is carried by the shaft 7 so that movement is transmitted through these members directly to the shaft 1. In this condition all of the other operating parts of the transmission mechanism are absolutely free so there is no danger of injuring the mechanism or of injuring the operator by the other parts of the mechanism while the two shafts are directly connected together. Similarly it might be shown that on shifting the plunger 23ˣ the gear 18 carrying the clutch member 18ᵃ will cause the transmission of an intermediate speed to the driven shaft 1 while the gear 20 may be brought into operation by the plunger 21ˣ to cause the reverse movement of the shaft 1. These movements are effected while the gears which transmit the movement are in mesh, thus obviating any tendency to strip the teeth from the gears.

The arm 24 is brought back to its central position by means of the spring 30 after the clutch members 4ʸ and 6ˣ have been brought out of mesh. The slot in the link 28 also serves to permit the plunger 29ˣ to return to its neutral position.

Another feature to which I desire to call attention is the fact that by the use of this apparatus, one is enabled to go from a lower speed, such as "intermediate" directly into "high" by the movement of a single lever. This is of considerable importance in automobile operation. Consider the case where the automobile driver has manipulated the lever (not shown) which draws out the plunger 23ˣ. Motion is communicated from the drive shaft 7 through 16, 18, 10, 9, gear 8, 3, 3ˣ, 4ˣ, 4, to shaft 1; that is to say, the device will be running on "intermediate." Now, by manipulating the plunger 29ˣ, the sleeve or member 4 may be shifted so as to engage the collar or member 6 and thus bring the two shafts 7 and 1 into direct connection so as to run the automobile on "high." Assume further that the river is approaching a hill which he thinks he can ascend on high speed, but he finds that the power is not sufficient. By reversing the movement of the plunger 29ˣ he can at once go into "intermediate," assuming that the plunger 23ˣ has been pulled outwardly as before stated. This change of speed by the shifting of a single plunger or lever I regard as an important feature of my invention.

I claim:—

1. In a variable speed gear, a drive shaft, a driven shaft, a fixed clutch member at the end of said drive shaft, a slidable clutch member carried by said driven shaft and adapted to engage the fixed clutch member on the drive shaft, a gear loosely mounted on said driven shaft on the opposite side of said slidable clutch member from the fixed clutch member, a second fixed clutch member on said drive shaft, a plurality of slidable gears disposed on said drive shaft, each of said last-named slidable gears having a clutch member arranged to engage said second-named fixed clutch member on said drive shaft, an auxiliary shaft, an individual gear carried by said auxiliary shaft for each of the slidable gears on said drive shaft and in constant mesh with its associated gear, and a gear carried by said auxiliary shaft and being in constant mesh with said loosely mounted gear on said driven shaft.

2. In a variable speed gear, a drive shaft, a driven shaft, a fixed clutch member at the end of said drive shaft, a slidable clutch member carried by said driven shaft and adapted to engage the fixed clutch member on the drive shaft, a gear loosely mounted on said driven shaft on the opposite side of said slidable clutch member from the fixed clutch member, a second fixed clutch member on said drive shaft, a plurality of slidable gears disposed on said drive shaft, each of said last-named slidable gears having a clutch member arranged to engage said second named fixed clutch member on said drive shaft, an auxiliary shaft, an individual gear carried by said auxiliary shaft for each of the slidable gears on said drive shaft and in constant mesh with its associated gear, a gear carried by said auxiliary shaft and being in constant mesh with said loosely mounted gear on said driven shaft, and means for moving any one of the slidable gears on said drive shaft into and out of operative relation with the second named fixed clutch member on said drive shaft.

3. In a variable speed gear, a drive shaft, a driven shaft, a fixed clutch member at the end of said drive shaft, a slidable clutch member carried by said driven shaft and adapted to engage the fixed clutch member on the drive shaft, a gear loosely mounted on said driven shaft on the opposite side of said slidable clutch member from the fixed clutch member, a second fixed clutch member on said drive shaft, a plurality of slidable gears disposed on said drive shaft, each of said last-named slidable gears having a clutch member arranged to engage said second named fixed clutch member on said drive shaft, an auxiliary shaft, an individual gear carried by said auxiliary shaft for each of the slidable gears on said drive shaft and in constant mesh with its associated gear, a gear carried by said auxiliary shaft and being in constant mesh with said loosely mounted gear on said driven shaft, means for moving any one of the slidable gears on said drive shaft into and out of operative relation with the second named fixed clutch member on said drive shaft, said last-named means comprising a plunger for each of said slidable gears, and a yoke connected to said plunger and arranged to engage a portion of its individual slidable gear.

JAMES W. CAMPBELL.

Witnesses:
ROBERT G. WITHERS,
JEROME L. VAN DERWERKER.